March 5, 1940. C. A. GUSTAFSON 2,192,439
ROAD MACHINE
Filed Sept. 12, 1938 3 Sheets-Sheet 1
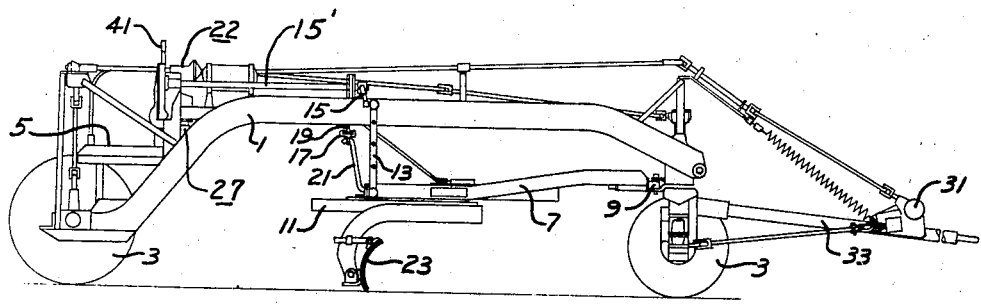
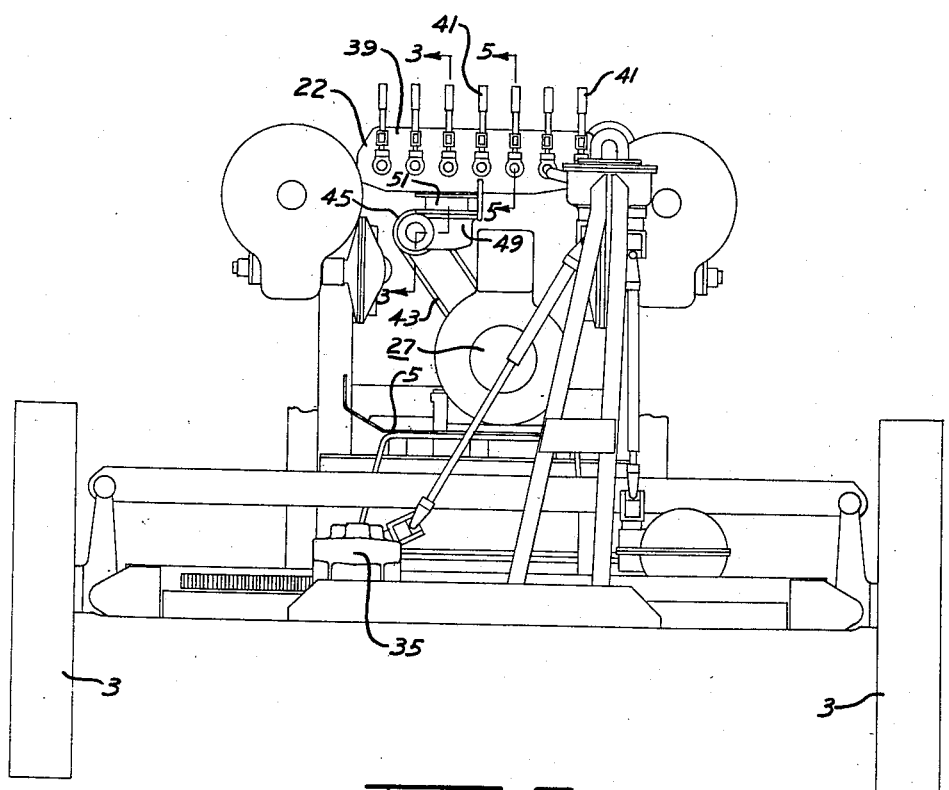
INVENTOR.
CARL A. GUSTAFSON
BY
ATTORNEY.

March 5, 1940.  C. A. GUSTAFSON  2,192,439
ROAD MACHINE
Filed Sept. 12, 1938   3 Sheets-Sheet 2
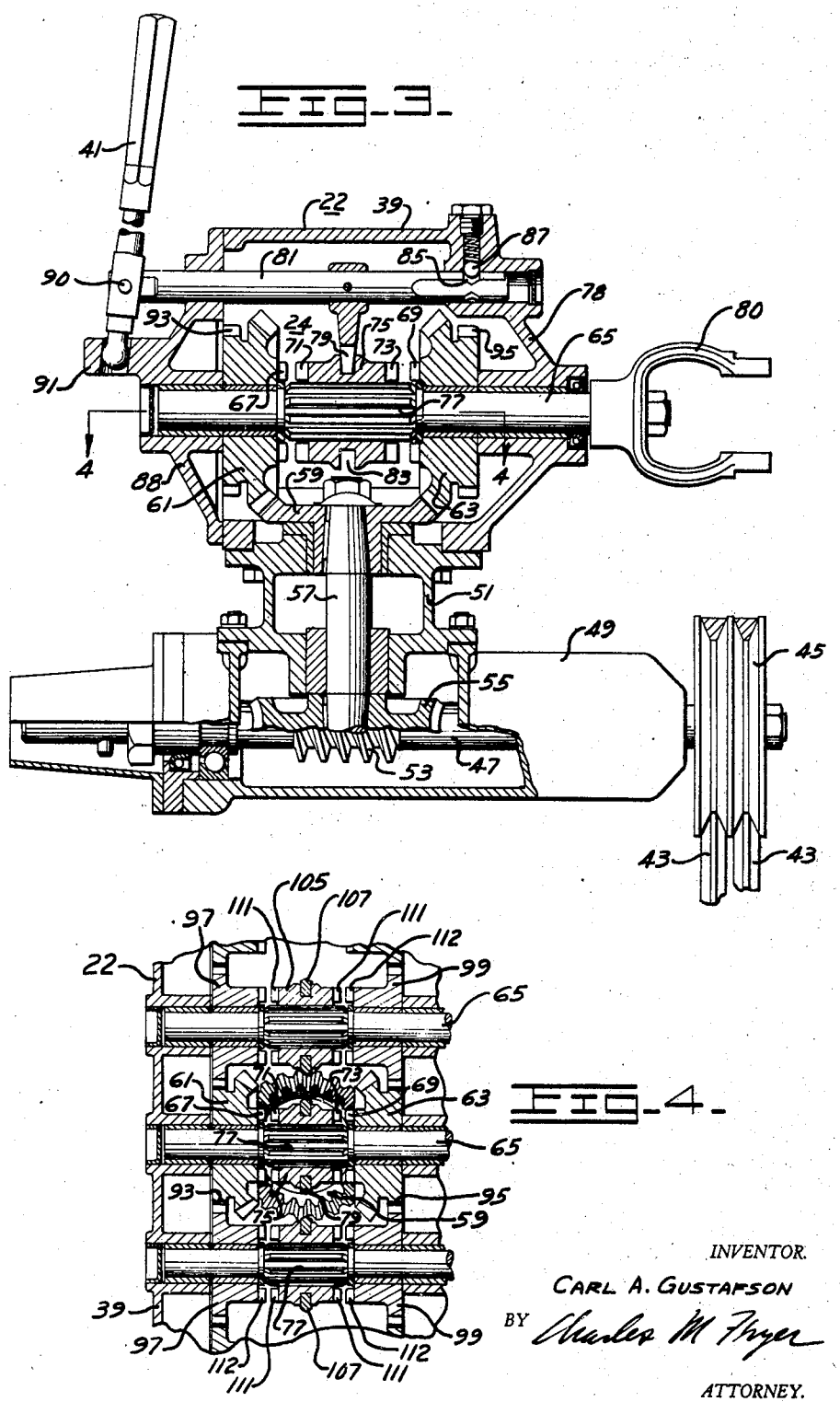
INVENTOR.
CARL A. GUSTAFSON
BY Charles M. Fryer
ATTORNEY.

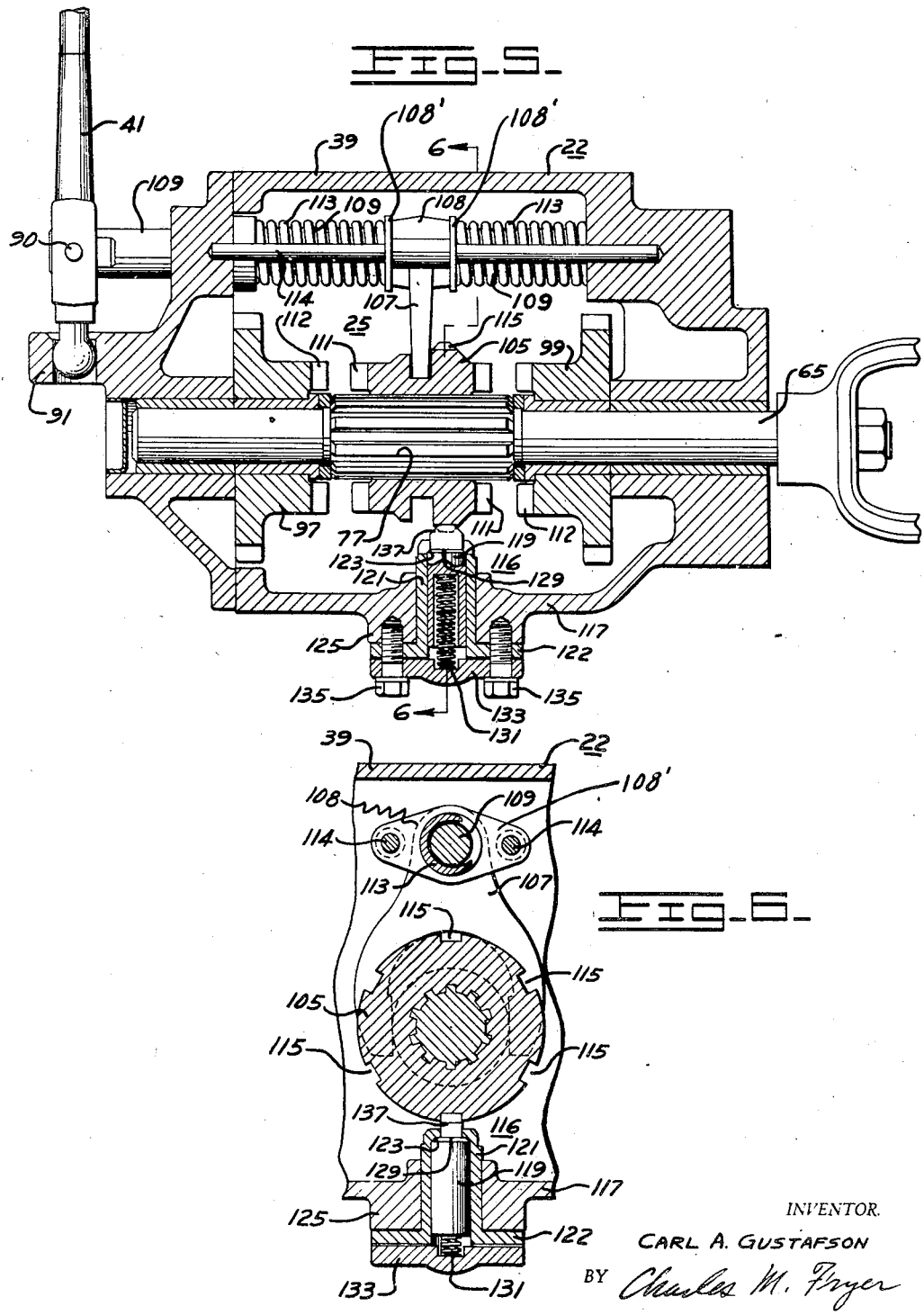

Patented Mar. 5, 1940

2,192,439

UNITED STATES PATENT OFFICE 2,192,439

ROAD MACHINE

Carl A. Gustafson, Peoria, Ill., assignor to Caterpillar Tractor Co., San Leandro, Calif., a corporation of California Application September 12, 1938, Serial No. 229,505

10 Claims. (Cl. 37—156)

My invention relates to road machines, and more particularly to the adjusting and control mechanism thereof.

Road machines, by reason of the fact that they are designed to perform numerous and varied operations in the making and preparation of roads, the digging of ditches and the cutting of banks, necessarily embody many parts which are designed for wide range of adjustment to take care of the many duties for which such a machine is designed. Certain of these adjustments relate to the steering of the vehicle, others pertain to the positioning and adjustment of the wheels, whereas other adjustments are involved in the positioning of the earth-working tool or blade. With respect to those parts of the machine so adjustable, the tool and the steering mechanism, when employed in the performance of their various functions are necessarily subjected to severe intermittent strains and stresses resulting in vibration of these parts. Such vibration is particularly prone to bring about "crawling" of the mechanism which is employed in the machine to obtain adjustment of the steering mechanism, and the earth-engaging tool, especially the lift adjusting mechanism for such tool. This results, after a time, in working of the tool or steering mechanism out of adjustment, which is undesirable.

For this reason, it has, heretofore, been the practice to employ friction braking means for such adjusting mechanisms in an effort to preclude the adjusting mechanisms from "crawling," and in this manner prevent the adjusted parts from working out of adjustment. While friction braking means offered somewhat of a solution to the problem, the action thereof was not at all times positive and certain, because the braking surfaces were subject to wear and consequently, when not in proper adjustment, the efficacy of the braking means became impaired, which resulted in "crawling" of the associated adjusting mechanism in response to the severe vibration transmitted thereto. Furthermore, on account of the ever present friction existing between the braking surfaces of the braking means, such means necessarily absorbed some power during operation of the adjusting mechanism which was wasted; and in view of the wear to which the braking surfaces were subjected, the braking means required constant attention in an attempt to maintain them in proper working condition.

It is accordingly an object of my invention to provide improved:

(1) Means for positively precluding "crawling" of adjusting mechanism of a road machine irrespective of vibration which may be imparted thereto; and (2) Means which is of such character as to require little or no attention, and which will not lose its ability to maintain the adjusted part of a road machine in proper adjustment.

Additional objects of the invention will be brought out in the following description of the same.

In general I have accomplished the above objects by utilizing a positive acting locking or dogging means at a suitable point in the adjusting mechanism associated with an adjustable part. This locking means is so designed as to permit reversible operation of the adjusting mechanism with which it is associated without requiring any manipulations on the part of the operator, other than what he normally has to perform in controlling the operation of the adjusting mechanism. Immediately upon completion of adjustment of such associated adjustable part of the machine, the locking means is designed to engage automatically the adjusting mechanism in such a manner as to interlock it with a stationary portion of the machine, to thereby preclude movement thereof in either direction, which would otherwise occur in response to the severe vibrations and stresses to which such adjusting mechanism is usually subjected during operation of the machine.

For a more detailed description of the invention, reference will be made to the accompanying drawings wherein:

Fig. 1 is a schematic side elevation of a road grader machine.

Fig. 2 is a rear end elevation of the machine of Fig. 1, on a scale larger than that of Fig. 1.

Fig. 3 is a vertical cross-sectional view, taken in planes indicated by line 3—3 in Fig. 2; portions of the structure being shown in elevation for clarity; the scale of Fig. 3 being larger than that of Fig. 2.

Fig. 4 is a fragmentary horizontal cross-section taken in a plane indicated by line 4—4 of Fig. 3.

Fig. 5 is a vertical cross-sectional view, taken in a plane indicated by line 5—5 of Fig. 2; on a scale larger than that of Fig. 2.

Fig. 6 is a fragmentary vertical cross-sectional view, taken in planes indicated by line 6—6 of Fig. 5.

My invention pertains to any type of road machine having adjustable parts, which may be either a self-propelled or a tractor drawn machine. The machine, chosen for the purpose of illustrating my invention, is a tractor drawn grader, and comprises a main frame 1 supported upon suitable wheels 3, and provided with an operator's station 5 at the rear end thereof. Below the main frame is a circle supporting or sub-frame 7 universally connected at 9 to the front end of the main frame and carrying the usual circle 11. Such circle is rotatable about its axis and is capable of being raised or lowered through adjustable lift links 13, one at either side of the machine (only one showing). Each of these links is universally connected to the sub-frame 7 and to the end of a rotatable crank or lift arm 15 secured to rotatably mounted shaft 15' on the main frame. Lateral adjustment of the circle 11 is obtained through the use of a transversely shiftable member 17 which is slidably mounted on a rail 19 positioned transversely of and beneath the main frame 1; movement of the member 17 being transmitted to the circle 11 through a pivotally connected shift link 21. A blade 23 carried by the circle 11 is thus adapted to be adjusted to any of a number of desired positions. For a more detailed description of a machine of this type, reference is made to my prior patent, No. 2,037,720, dated April 21, 1936.

Each of the blade adjustments is individually controllable from the operator's station 5; suitable power control apparatus 22, of the type described in my prior Patent No. 2,034,141, dated March 17, 1936, being located at the operator's station for this purpose and constituting a part of the various adjusting mechanisms for the blade. In addition to the blade adjustments, there are other adjustments to be made on the machine. For example, there is a steering adjustment at 31 for the tractor pole 33, and also a rear axle sideshift adjustment at 35 to determine the position of the rear wheels with respect to the main frame 1, as well as adjustments to control the leaning positions of both the front and the rear wheels. All of these additional adjustments are also individually controllable from the operator's station through the power control apparatus 22 connected to drive suitable telescopic shafting.

Such control apparatus includes a plurality of reversibly operable clutch assemblies grouped within a common housing 39 located adjacent the operator's station 5. Each of such assemblies is provided with a suitable control handle 41 externally of the housing 39 and within convenient reach of the operator, by which power from an engine 27 may be applied thereto to effect adjustment of the part associated therewith. Such clutch assemblies provide a desirable location for the locking means of my invention; and I employed such locking means in association with each of the clutch assemblies which controls adjusting mechanism for an adjustable part that is subject to vibration or stresses sufficient to throw such part out of adjustment should the locking means be omitted. The adjustable parts which I have found are particularly vulnerable in this respect, are the lift links for the blade and the steering draft pole; and in the embodiment of the invention illustrated, the locking means is only employed in association with these parts. It is to be understood, however, that the locking means of my invention may be employed in connection with any adjustable part of a machine where difficulty in maintaining adjustment is found to occur.

In the power control apparatus 22, the clutch assemblies which have such locking means in association therewith are slightly different in construction than those that do not have them. For this reason, in referring to the individual clutch assemblies as a unit, different reference characters are employed. Fig. 3 illustrates a clutch assembly without the locking means, which is designated by reference character 24; while the clutch assembly in Fig. 5, provided with the locking means, is indicated by reference character 25. There are a large number of identical elements in such clutch assemblies and these are designated by like reference numerals.

Certain parts of the clutch assemblies 24 and 25 are constantly driven from the engine 27 through belts 43, and sheaves 45 secured to shaft 47 journalled in housing 49 which is attached to the clutch assembly housing 39 through an intermediate flanged section 51. Shaft 47 carries worm 53 meshing with a worm wheel 55 on upright shaft 57 journalled in bushings in the flanged section 51. At its upper end, shaft 57 has a bevel gear 59 keyed thereon, which meshes with opposite bevel gears 61 and 63 journalled for rotation about bushings on one of a plurality of shafts 65; each of shafts 65 forming part of an associated clutch assembly 24 or 25. Gears 61 and 63 have clutch teeth 67 and 69, respectively, formed thereon, adapted to be engaged by clutch teeth 71 and 73, respectively, formed on opposite ends of a double faced clutch collar element 75 which is rotatable with such shaft 65 but axially slidable therealong by means of splines 77. From the preceding, it is seen that gears 61 and 63 rotate constantly in opposite directions, and that by engaging clutch element 75 with one of such gears, the associated shaft 65 will be rotated in one direction; and when engaged with the other gear, such shaft 65 will be rotated in the opposite direction. Each of shafts 65 extends through wall 78 of housing 39, and carries a yoke 80 which is adapted to be coupled to the remainder of the adjusting mechanism.

Clutch element 75 is manually shiftable in either direction to transmit a drive from either of oppositely rotating gears 61 and 63 to the associated shaft 65, by means of fork 79 pinned to an axially shiftable shaft 81 and engaging in a peripheral groove 83 formed in the clutch element 75. Such shaft 81 is mounted in suitable bosses in housing 39 and is provided at one end with a peripheral groove 85 adapted to be engaged by spring-pressed ball 87, when the shaft 81 and clutch element 75 are in "neutral" position, that is when the clutch element 75 is not in engagement with either gear 61 or 63. The opposite end of shaft 81 extends through a wall 88 of housing 39 opposite to wall 78, and an associated control lever 41 is pivoted intermediate its ends at 90, to the protruding end of this shaft 81. At its lower end, control handle or lever 41 is made spherical and of a size to fit into an apertured boss 91 on the wall 88. Thus a pivotal floating mounting is provided for each control lever 41 which permits vertical movement of such lever during longitudinal movement of the associated shaft 81 in controlling operation of the associated clutch assembly. Movement of control lever 41 of Fig. 3 forwardly or rearwardly of its neutral position fixed by engagement of the spring pressed ball 87 in the peripheral groove 85, determines engagement of the clutch element 75 with either the gear 63 or the gear 61 to control the direction of rotation of the associated shaft 65, and hence the adjustable part of the machine connected thereto.

Means is provided for continuously transferring the power from constantly rotating gears 61 and 63 to control operation of all shafts 65 in the manner described, as is illustrated in Fig. 4. Gears 61 and 63 are provided with spur gears 93 and 95, respectively, each of which forms an element in a train of intermeshing spur gears 97 and 99, respectively, the trains of spur gears being oppositely disposed. Each pair of such opposite spur gears 97 and 99 is journalled for rotation about an associated shaft 65 of a clutch assembly; and because of being driven by gears 61 and 63, which rotate in opposite directions, the opposite spur gears 97 and 99 of each pair are also driven constantly in opposite directions. Thus each pair of oppositely disposed spur gears 97 and 99 constitutes means for effecting the selective application of power to an associated shaft 65, through control mechanism similar to that described.

Referring particularly to Figs. 5 and 6, which disclose a clutch assembly 25, employing the positive locking or latching means of my invention, each of shafts 65 upon which spur gears 97 and 99 are mounted, has splines 77 in meshing engagement with clutch element 105 rotatable with the shaft and adapted to be shifted axially in either direction, by means of a fork 107 engaging a peripheral slot in the clutch element which is provided with teeth 111 on each end thereof, to enable engagement with complementary teeth 112 formed on those surfaces of the spur gears 97 and 99 facing the ends of the clutch element. Shifting of the clutch element 105 is accomplished through resilient means for automatically restoring both the control handle 41 and the clutch element 105 to neutral position upon release of the clutch handle by the operator. For this purpose, the shifting fork 107 includes a head portion 108 secured to axially shiftable shaft 109 corresponding to the shaft 81 of the clutch assembly 24. Mounted on the shaft 109 within the housing are a pair of similar coil springs 113 under partial compression, with the head 108 of the shifting fork 107 therebetween. The head has side wing extensions 108' formed with apertures to loosely receive supporting rods 114, which provide a pair of spaced guide rails on which the fork may slide.

Fork 107 is thus rendered shiftable in response to actuation of the associated control handle; and such movement of the fork will take place against the opposition offered by either one or the other of the springs 113 depending upon the direction of shift. Thus, it will be apparent that upon release of the control handle 41 from a position which determines engagement of the clutch element 105 with either one of the spur gears 97 or 99 to accomplish an adjustment of the blade lift means 13 or steering means 31, for example, the clutch element 105 will be immediately restored to its neutral position through the action of one or the other of the above mentioned springs 113, which ever may happen to have been under greater compression during the adjusting operation. This restoring action of the springs 113 assures prompt and automatic return of clutch element 105 to neutral position; so that the locking means to be described, may quickly lock such clutch element and the associated adjusting mechanism. In this connection, it is to be understood that as long as an adjustment is to be made, control handle 41 must be manually held, and that the cooperating clutch teeth 111 and 112, and 67 and 71 are beveled to provide a camming action for allowing immediate disengagement thereof upon manual release of the control handle.

The locking means comprises notches 115 provided at regular intervals in the periphery of clutch element 105, for engagement by a lock mechanism 116 removably mounted in the lower wall 117 of housing 39, immediately below the clutch element 105. Such lock mechanism comprises a spring pressed plunger member 119 slidable in sleeve 121 which is formed with a flange 122 at one end and, at the opposite end, with an internal shoulder 123 about a non-circular aperture. Sleeve 121 is adapted to fit in an opening provided through a boss 125 formed on wall 117 of the housing 39, with the flange 122 thereof abutting against the lower surface of the boss 125. Plunger 119 is formed with a shoulder 129 to engage the internal shoulder 123 of the sleeve 121, which limits its movement toward the notched clutch element 105, and is pressed by a spring 131 which is seated within a chamber formed in the plunger 119; the spring being maintained in compression by a cover plate 133 positioned against flange 122 and secured to boss 125 by suitable cap screws 135. The end 137 of the plunger is narrower than the body of the plunger and is of a shape complementary to that of the non-circular aperture at shoulder 123, to thus preclude turning of the plunger and insure proper engagement thereof with a notch 115. To facilitate such engagement, end 137 is tapered and the notches are tapered in a complementary fashion.

Lock mechanism 116 is so located as to be directly in line with the notched portion of the clutch element 105 when in its neutral position; movement of the clutch element 105, when shifted into engagement with either of spur gears 97 or 99, being sufficient to throw the lock mechanism and the notched portion of the clutch element 105 out of line and thereby effect disengagement of the plunger 119 from clutch element 105. Thus, it will be apparent that in shifting the clutch element 105 to either side of its neutral position for operation of the adjusting mechanism of which it constitutes a part, the locking means will become ineffective and will permit proper operation of the adjusting mechanism without requiring any manipulation on the part of the operator, which he would not otherwise have to perform in controlling operation of the adjusting mechanism. As soon as the desired adjustment of the part of the machine being adjusted is accomplished, and the control handle 41 is released, the handle will automatically be immediately returned to neutral position due to the action of the resilient means 113, and the clutch element 105 will be similarly immediately restored to its neutral position.

When such restoration occurs, the notched portion of clutch element 105 is in alignment with the plunger 119 of the lock mechanism; and due to rotational inertia, the clutch element will in all probability rotate sufficiently to enable the plunger to slip into one of notches 115 and thereby lock the adjusting mechanism and the part adjusted therewith against movement. However, even should clutch element 105 stop rotating before a notch 115 is presented for engagement by plunger 119, any tendency for the adjusting mechanism to shift or "crawl" will bring about the desired locking of the adjusting mechanism;

and after such locking is effected further "crawling" is precluded.

Although in the power control mechanism which is illustrated in the drawings, the locking means is only associated with certain of the reversibly operable clutch assemblies that are connected to adjust parts which I have found are most apt to work out of adjustment for the reasons previously mentioned, it is apparent that such locking means may be employed with all of the adjusting mechanisms, if so desired.

I, therefore, claim as my invention:

1. A road machine having adjustable mechanism; adjusting mechanism therefor including a rotatable shaft connected to said adjustable mechanism, a driving member, and a peripherally notched clutch element rotatable with said shaft but axially shiftable from a neutral position on said shaft to engage said driving member; and a resiliently pressed element located on a stationary part of said machine at said neutral position for engaging a notch in said notched clutch element to lock said adjusting mechanism.

2. A road machine having adjustable mechanism; adjusting mechanism therefor including a rotatable shaft connected to said adjustable mechanism, a driving member, and a peripherally notched clutch element rotatable with said shaft but axially shiftable from a neutral position on said shaft to engage said driving member; a resiliently pressed element located on a stationary part of said machine at said neutral position for engaging a notch in said notched clutch element to lock said adjusting mechanism; and resilient means for automatically moving said clutch element to said neutral position and centering it at said neutral position.

3. A road machine having adjustable mechanism; adjusting mechanism therefor including a rotatable shaft connected to said adjustable mechanism, a pair of oppositely rotatable driving members, and a peripherally notched clutch element rotatable with said shaft but axially shiftable from a neutral position on said shaft to engage either of said driving members to thereby enable said shaft to be selectively rotated in either direction; and a resiliently pressed element located on a stationary part of said machine at said neuutral position for engaging a notch in said notched clutch element to lock said adjusting mechanism irrespective of the direction it may have been operated.

4. A road machine having a tool supporting frame; a pair of power operable adjusting mechanisms, each of which is connected to a side of said tool supporting frame for lifting or lowering such side and includes a clutch element movable from a neutral position to transmit a drive through said adjusting mechanism from a source of power; and automatic means associated with each of said clutch elements for positively engaging the clutch element at said neutral position to lock the adjusting mechanism of which such clutch element forms a part.

5. A road machine having adjustable mechanism; adjusting mechanism therefor including a drivable member, and a clutch element movable from a neutral position to engage said drivable member for transmitting a drive to said adjustable mechanism; and means for engaging said clutch element at said neutral position to lock said adjusting mechanism.

6. A road machine having adjustable mechanism; adjusting mechanism therefor including a drivable member, and a clutch element movable from a neutral position to engage said drivable member for transmitting a drive to said adjustable mechanism; means for engaging said clutch element at said neutral position to lock said adjusting mechanism; and means for automatically moving said clutch element to said neutral position upon disengagement thereof from said drivable member.

7. A road machine having adjustable mechanism; adjusting mechanism therefor including a drivable member rotatable about an axis, and a clutch element axially shiftable along said axis from a neutral position to engage said drivable member for transmitting a drive to said adjustable mechanism; and resiliently pressed means located at said neutral position for engaging said clutch element to lock said adjusting mechanism.

8. A road machine having adjustable mechanism; adjusting mechanism therefor including a drivable member rotatable about an axis, and a notched clutch element axially shiftable along said axis from a neutral position to engage said drivable member for transmitting a drive to said adjustable mechanism; resiliently pressed means located at said neutral position for engaging a notch in said notched clutch element to lock said adjusting mechanism; and means for automatically moving said clutch element to said neutral position and centering it at said neutral position.

9. A road machine having adjustable mechanism; adjusting mechanism therefor including a member rotatable about an axis, power means for continuously rotating said member, means adapted to be rotated, and a clutch element axially shiftable along said axis from a neutral position to engage said continuously rotatable member to transmit a drive to said means adapted to be rotated; and means for automatically engaging said clutch element at said neutral position to lock said adjusting mechanism.

10. A road machine having adjustable mechanism; adjusting mechanism therefor including a pair of drivable members oppositely rotatable about an axis, and a clutch element axially shiftable from a neutral position to engage either of said drivable members for transmitting a selected drive in either direction to said adjustable mechanism; and means at said neutral position for automatically engaging said clutch element to lock said adjusting mechanism.

CARL A. GUSTAFSON.